United States Patent [19]

Fleurance et al.

[11] Patent Number: 4,549,285
[45] Date of Patent: Oct. 22, 1985

[54] APPARATUS FOR REAL TIME CORRELATION IN SEISMIC PROSPECTION

[75] Inventors: Claude Fleurance, Saint Julien de Concelles; Jean-Claude Naudot, Carquefou, both of France

[73] Assignee: Societe d'Etudes, Recherches et Constructions, France

[21] Appl. No.: 396,008

[22] Filed: Jul. 7, 1982

[30] Foreign Application Priority Data

Jul. 8, 1981 [FR] France .................. 81 13433

[51] Int. Cl.⁴ .................. G01V 1/36; G01V 1/28
[52] U.S. Cl. .................. 367/60; 367/39; 367/41
[58] Field of Search .................. 367/59, 60, 63, 38, 367/39, 40, 42, 41; 364/421; 346/33 C

[56] References Cited

U.S. PATENT DOCUMENTS

| | | | |
|---|---|---|---|
| 3,340,499 | 9/1967 | Hadley | 367/60 |
| 3,698,009 | 10/1972 | Barbier | 346/33 C |
| 3,863,057 | 1/1975 | Siems . | |
| 3,863,058 | 1/1975 | Savit . | |
| 4,037,190 | 7/1977 | Martin | 367/40 |
| 4,058,791 | 11/1977 | Martin et al. | 367/42 |
| 4,064,481 | 12/1977 | Silverman | 364/421 |
| 4,201,972 | 5/1980 | Edwards et al. | 367/60 |
| 4,214,128 | 7/1980 | Bovee | 367/60 |

FOREIGN PATENT DOCUMENTS

| | | |
|---|---|---|
| 1161998 | 8/1969 | France . |
| 2068147 | 8/1971 | France . |
| 2012083 | 7/1979 | United Kingdom . |

Primary Examiner—Salvatore Cangialosi
Assistant Examiner—Ian J. Lobo
Attorney, Agent, or Firm—Schwartz, Jeffery, Schwaab, Mack, Blumenthal & Evans

[57] ABSTRACT

The invention provides an apparatus for seismic prospecting which is to effect a correlation in real time between a pilot signal and a picked-up seismic signal. With N being the number of samples corresponding to the desired thoroughness of investigation, the apparatus comprises the following: a buffer of N samples of the pilot signal; at least one buffer for a sample of the picked-up signal; at least one calculation circuit, in which the correlation operations are carried out; at least one result memory, which is to contain the N points of the correlation function; and a circuit for addressing the memories.

6 Claims, 1 Drawing Figure

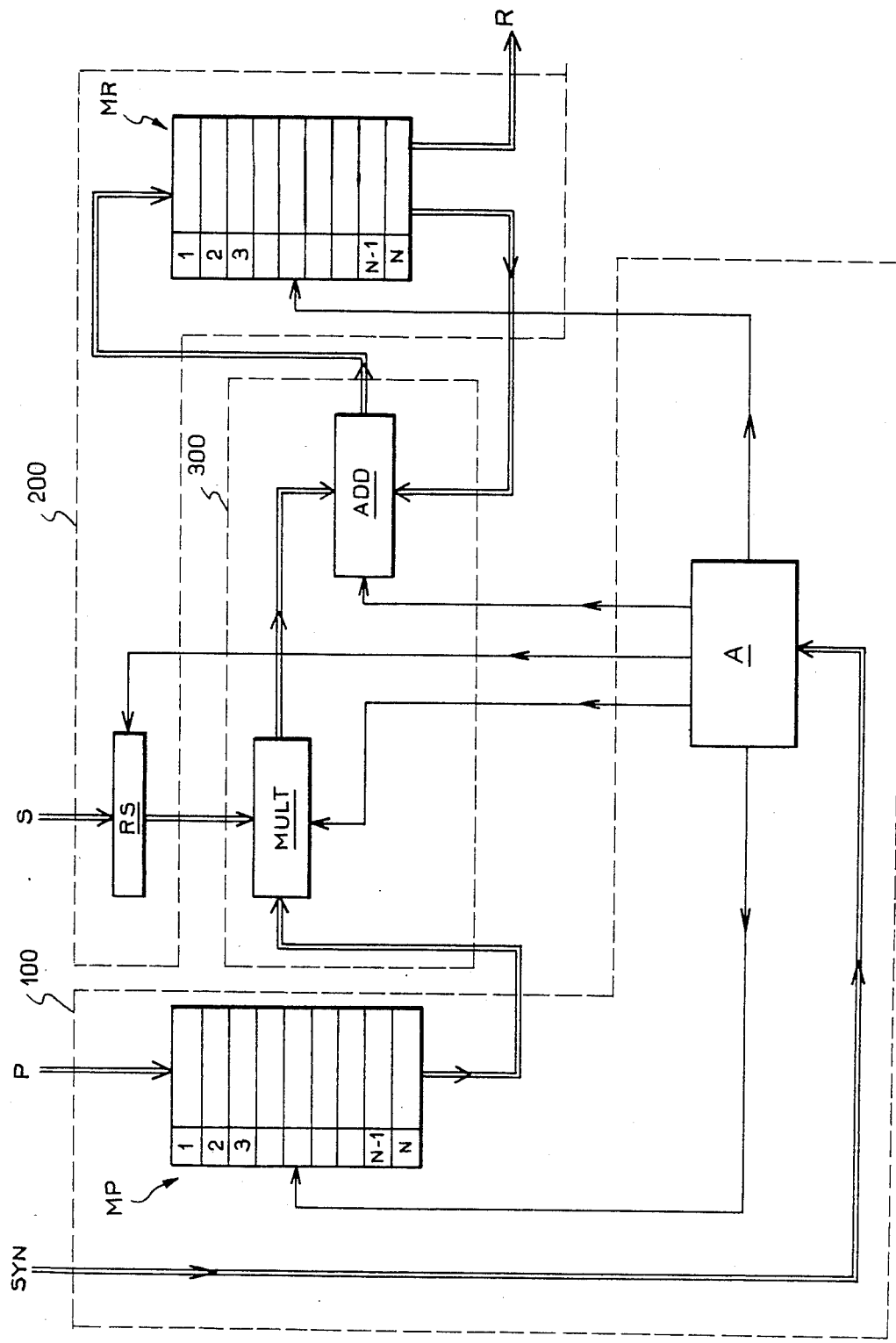

APPARATUS FOR REAL TIME CORRELATION IN SEISMIC PROSPECTION

BACKGROUND OF THE INVENTION

1. Field of the Invention

This invention relates to an apparatus for seismic prospection of the subsoil by vibration.

2. Description of Prior Art

A vibrating source is used to emit a signal into the ground in a known manner, the spectrum of this signal covering the range of signals which are usually transmitted by the subsoil. A signal of this type, termed a pilot signal, may be, for example a vibration of variable frequency, linear or non-linear as a function of time, between two extreme frequencies.

Seismic pick-ups or geophones are positioned at different points on the surface of the ground and, by comparing the signal received by these pick-ups, termed the seismic signal, with the pilot signal, the ground response is obtained which provides useful indications about the nature thereof.

This comparison is generally effected by an cross correlation between the pilot signal and each of the seismic signals.

Thus, if the pilot signal is denoted P(t) and the seismic signal which is received is denoted S(t), the cross correlation function of these two signals is as follows:

$$I(t) = \int_0^\sigma P(x).S(t+x)dx$$

In practice, a pilot signal is limited to a duration $\theta p$, and the correlation function is only considered over a limited time interval T, termed "thoroughness investigation". Under these conditions, the previous expression becomes the following:

$$I(t) = \int_0^{\theta_p} P(x).S(t+x)dx,$$

where $t \epsilon (O,T)$.

Bearing in mind the considerable dynamic range of the signals, it is desirable for the correlation to be effected in a digital manner. Thus, the pilot signal is memorized in successive pilot samples $P_i$, $i = 1 \ldots p$, p being the number of samples corresponding to the complete duration of the pilot signal, also termed "vibration length". For example, for a vibration length of 30 seconds and a sampling step of 2 milliseconds, $p = 15,000$ samples.

For their part, each of the seismic signals received is numbered in successive samples $S_i$, where $i = 1 \ldots s$, and where $s = p + N$, N being the number of samples corresponding to the thoroughness of investigation T. For example, when $T = 5$ seconds, $N = 2,500$ samples, s is termed the "acquisition length".

Thus, $s = 17,500$ samples $S_i$ for each seismic signal and in each test which is carried out. It is already possible to note that this number is much higher than that N corresponding to the thoroughness of investigation.

The cross correlation function then becomes the following:

$$I(t) = \sum_{i=1}^{p} P_i \cdot S_{i+t-1},$$

where $t = 1 \ldots N$.

Up until the present time, these samples of seismic signals were recorded on magnetic tape, in view of subsequent calculation by a data processing center, being provided with adequately large memory means and calculation means.

In the above-mentioned example, assuming that the work is carried out using 96 seismic channels, it is clear that $17,500 \times 96 = 1,680,000$ samples of seismic signals have to be recorded for each test which is carried out in addition to the pilot signal.

Moreover, since the energy which is emitted into the ground during a test is low, several repeated tests are generally carried out while keeping the source and the pick-ups in the same place, and using the same pilot signal. Each new value which is measured is added to the total of the measurements from the previous tests. In practice, since up until the present time, sufficiently powerful calculation means have not been available for carrying out correlation operations on the ground, and since it would have been prohibitive to record the signals obtained during each of the tests, the signals obtained by the same geophone during the same series of tests were cumulated. The correlation operations were then carried out once, off line in time, on the result of the addition.

This method, in which correlation is effected after summation, first of all has the disadvantage of only providing a result from overall values, without considering the variations in the pilot signal from one test to another. A high level of accuracy necessitates a pilot signal which is absolutely constant throughout the measurements. Moreover, it only allows the work to be carried out with an identical pilot signal (to close innaccuracies) for all the measurements.

In contrast, a cross correlation of the signals during each measurement, before summation of the calculated result, allows the work to be carried out with a pilot signal which varies from one measurement to another or, if the same pilot signal is retained, it eliminates deviations discovered from one test to another. Above all, it would present the advantage of providing an immediate result, by calculation in real time, the accuracy of which result would improve as the tests progressed.

The main obstacle which has until now prevented achievement of a solution of this type is that of the size of the memory necessary for making the calculations. Since signals of a long duration are concerned, the number of samples to be registered tends to increase and it becomes very difficult to dimension the memory, numerous versions being necessary depending on the length of the pilot. Up until the present time, these restrictions, have not allowed the provision of a seismic prospecting material which may be easily moved and used on the ground.

BRIEF SUMMARY OF THE INVENTION

This invention proposes an apparatus which allows the correlation to be carried out in real time, and before summation. This apparatus makes it possible to break away completely from the variations in duration of the signals, using only memories of a fixed and reduced length, corresponding to the desired length of investigation. Consequently, this memory size is completely independent of the acquisition length, i.e., of the duration of the pilot signal, and it becomes possible to modify this pilot signal very easily as a function of the operational conditions.

To this end, and while retaining the symbols as defined above, the apparatus comprises a buffer of N samples of the pilot signal, and, for each seismic path: one buffer for a sample of the picked-up signal and one result memory which is to recover in a cumulative manner the result of the cross correlation calculation in the form of N totals of products I (t), where t=1...N. The apparatus also comprises a circuit for addressing the pilot and result memories, and at least one calculation circuit, in which the products are evaluated between each of the picked-up samples and N consecutive samples of the pilot signal.

In fact, the following calculations have to be evaluated:

$$I(1) = S_1 \cdot P_1 + S_2 \cdot P_2 + S_3 \cdot P_3 + \ldots + S_p \cdot P_p$$
$$I(2) = S_2 \cdot P_1 + S_3 \cdot P_2 + S_4 \cdot P_3 + \ldots + S_{p+1} \cdot P_p$$
$$I(3) = S_3 \cdot P_1 + S_4 \cdot P_2 + S_5 \cdot P_3 + \ldots + S_{p+2} \cdot P_p$$
$$\vdots$$
$$I(N-1) = S_{N-1} \cdot P_1 + S_N \cdot P_2 + S_{N+1} \cdot P_3 + \ldots + S_{N+p-2} \cdot P_p$$
$$I(N) = S_N \cdot P_1 + S_{N+1} \cdot P_2 + S_{N+2} \cdot P_3 + \ldots + S_{N+p-1} \cdot P_p$$

The address circuit of the apparatus according to the present invention advantageously co-operates, in a manner which will be described later on, with the calculation circuits, so that only one pilot memory of size N is used, allowing a considerable economy in memory size which makes the apparatus sufficiently compact for it to be used on the ground and in real time, unlike the existing apparatus in which correlation may only be carried out off line in a data processing centre.

An apparatus which is produced according to the present invention, having the characteristics described above, signals sampled over 16 bits and results calculated over 32 bits only requires a memory of 9.65 Mbits, whereas a conventional apparatus, of equal accuracy, needs 27 Mbits of acquisition memory, in addition to a magnetic recorder and processing in the data centre, the duration of which may be up to 17 hours for processing data corresponding to 100 cumulated measurements daily.

Other characteristics and advantages of the present invention will be revealed more clearly from reading the detailed description which follows, with reference to the single accompanying FIGURE.

BRIEF DESCRIPTION OF THE DRAWING

The FIGURE represents a block diagram of the correlation apparatus according to the invention.

DETAILED DESCRIPTION

The FIGURE shows a first, single circuit 100, comprising a memory MP of N samples of the pilot signal and a circuit A for addressing the memories of the apparatus, and for controlling the calculation circuits. This circuit 100 receives the pilot signal P which has been previously sampled, and it also receives a signal SYN allowing a synchronous operation of the assembly.

A circuit 200, corresponding to a seismic channel exists in as many samples as there are geophones. A single circuit 200 has been illustrated in the FIGURE, all the circuits 200 being identical. Each channel comprises a buffer seismic register RS receiving the signal S picked-up by the geophone, and a result memory MR of N samples of the correlation function calculated from the corresponding channel. Reading this memory provides the result signal R.

Finally, a calculation circuit 300 comprises a multiplier MULT and an adder ADD. This circuit exists in at least one sample and at the most in as many samples as seismic channels. In fact, the use of rapid circuits allows the provision of the calculation circuit which is common to several seismic channels. This disposition allows a considerable saving to be made in components.

Thus, it is possible to produce an apparatus according to the present invention in which one calculation circuit is common to two seismic channels (for a sampling step of 2 ms) or to four channels (for a step of 4 ms).

Thus, half (or a quarter) of these components are saved, compared to a solution in which each seismic channel would have its own calculation circuit.

In order to attain increased precision, the calculation circuits preferably operate with a floating point. The floating multiplication circuit MULT thus comprises, in a known manner, an adder circuit for the exponents and a multiplier circuit for the mantissa, and the floating addition circuit ADD comprises a shift circuit and an adder circuit.

During each acquisition cycle, the apparatus receives, in addition to the synchronisation signal SYN, a sample $p_i$ of the pilot signal P and, on each channel, a sample $S_i$ of the seismic signal S.

During the first cycle, the apparatus receives the samples $P_1$ and $S_1$, stores the sample $P_1$ in the first position of the pilot memory, a position which will be denoted $MP_1$, performs the multiplication $S_1 \times P_1$ and stores the result in the first position of the result memory, a position which will be denoted $MR_1$.

During the second cycle, $P_2$ is stored in $MP_2$, the multiplication $S_2 \times P_2$ is performed and the result is added to the contents of the memory $MR_1$. Moreover, the multiplication $S_2 \times P_1$ is performed and the result is stored in $MR_2$.

The same procedure is carried out in the third cycle, so that $MR_1$ contains the result $(S_1.P_1 + S_2.P_2 + S_3.P_3)$, $MR_2$: $(S_2P_1 + S_3.P_2)$, and $MR_3$: $S_3.P_1$.

The sample $P_3$ is arranged in $MP_3$.

The operations are continued in the same manner during the complete acquisition time.

After the $N^{th}$ cycle, the memory MP is full and contains the samples $M_1 \ldots M_N$ of the pilot signal, and the memory MR is completely filled with the samples:

$$MR_1: S_1 \cdot P_1 + \ldots + S_N \cdot P_N$$
$$\vdots$$
$$MR_N: S_N \cdot P_1 + \ldots + S_{2N} \cdot P_N$$

Since the calculation is restricted to N samples, it is confirmed that the sample $P_1$ has been used in the N product sums already produced. Nevertheless, it is of no use subsequent for achieving the cumulations in the N result memories, where later on, only the following samples $P_2 P_3 \ldots$ will intervene.

This is why, and in a characteristic manner of the present invention, instead of continuing to store the following samples of the pilot signal after the previous samples, the apparatus will substitute, during the $(N+1)$th cycle, in the memory $MP_1$, the sample $P_{N+1}$ for sample $P_1$, thus allowing optimum use of the memory. Due to this apparatus with a "circulating memory", only the samples which are still necessary will be retained, the new samples being substituted, as they are acquired, for the first samples which have become useless.

Thus, in the (N+2)th cycle, the following samples will be in the memory MP:
$P_{N+1}, P_{N+2}, P_3, P_4 \ldots P_N$.

The calculation continues thus up until the $s^{th}$ acquisition cycle, when the cumulation will be achieved in the memories $MR_1 \ldots MR_N$.

On the one hand, it is found that two memories MP and MR suffice in operating the apparatus, and that their length N is fixed and is much shorter than the acquisition length s. On the other hand, for each acquisition cycle, the number of elementary (addition and multiplication) operations is at the most equal to the number of samples corresponding to the depth of investigation N. Calculation circuits may be easily provided allowing these partial calculations to be made in the time interval between two acquisition cycles, in order to obtain the final result in real time, from the end of the last cycle, while also completely breaking away from the duration of acquisition.

For the summation of correlation results of one series of repeated tests providing low measurements, it suffices to repeat the previously described operation, keeping the results of the previous test in the memory MR. The correlated results are cumulated as the tests are carried out, whatever the imprecisions due to the variations in the pilot signal at each emission, because the correlations is carried out in real time with the instantaneous value of the pilot signal, instead of a signal average value.

It is quite clear that the above description is only provided by way of production example and it does not have a restricting character, and numerous variants in structure or production may be envisaged without thereby exceeding the scope of the present invention.

We claim:

1. In a system for seismic prospecting of subsoil by vibration, comprising:
   a source of controlled vibrations;
   at least one seismic channel comprising a seismic pick-up for receiving reflecting signals from the subsoil, and means for sampling and digitizing the signal received by the pick-up into successive picked-up samples;
   means for exciting the source by a pilot signal;
   means for sampling and digitizing the pilot signal into successive pilot samples; and
   digital recording means for recording signals derived from the pilot samples and picked-up samples,
   an apparatus for providing real time correlations for said seismic channel comprising:
   a buffer for storing N samples of the pilot signal, N being a number of samples associated with a time T corresponding to the predetermined degree of investigation;
   at least one buffer for storing one sample of the received signal;
   at least one calculation circuit comprising a multiplication circuit for producing the products of each picked-up sample multiplied by N consecutive samples of the pilot signal;
   at least one result memory, into which are cumulatively introduced N product sums respectively corresponding to correlations of the picked-up signal with the pilot signal, each of said correlations being determined as a function of a respective, variable time lag;
   a circuit for addressing the pilot signal buffer, the result memory, and also cooperating with said calculation circuits.

2. An apparatus according to claim 1, wherein each calculation circuit comprises a floating point circuit.

3. An apparatus according to claim 1 wherein each calculation circuit is common to two seismic channels.

4. An apparatus according to claim 1 wherein each calculation circuit is common to four seismic channels.

5. An apparatus according to claim 1 wherein said calculation circuit further comprises an addition circuit for adding the products produced in said multiplication circuit to corresponding memory locations in said result memory.

6. A method of seismic prospecting comprising:
   emitting controlled vibrations into subsoil to be studied in response to a pilot signal;
   sampling and digitizing the pilot signal into successive pilot samples;
   receiving a reflected signal from the subsoil;
   sampling and digitizing the received signal into successive picked up samples; and
   cross correlating the pilot and received signals in real time comprising:
   storing N samples of the pilot signal N in a pilot signal buffer having N locations, where N is a number of samples representing time T corresponding to the predetermined degree of investigation;
   individually storing one sample at a time of the received signal;
   multiplying the stored sample of the received signal by each of the N stored samples of the pilot signal to produce N products; and
   adding the N products to memory locations of a result memory to form N product sums respectively corresponding to correlations of the received signal with the pilot signal in accordance with the formula:

$$I(t) = \sum_{i=1}^{p} P_i \cdot S_{i+t-1}$$

wherein I(t) represents the correlation function stored in a result memory location t, and t = 1 .. . N, and p represents the number of samples corresponding to the complete duration of the pilot signal, each of said correlations being determined as a function of a respective variable time lag;
wherein said pilot samples are stored sequentially in said pilot signal buffer and locations in said pilot signal buffer are written over with new samples, and wherein said pilot signal buffer and said result memory are addressed by a circuit in order to carry out said cross-correlation.

* * * * *